United States Patent
Sato

(10) Patent No.: US 6,683,825 B2
(45) Date of Patent: Jan. 27, 2004

(54) OPTICAL DISK DRIVE UNIT

(75) Inventor: Nobuhiro Sato, Ebina (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 293 days.

(21) Appl. No.: 09/956,016

(22) Filed: Sep. 20, 2001

(65) Prior Publication Data

US 2002/0034132 A1 Mar. 21, 2002

(30) Foreign Application Priority Data

Sep. 21, 2000 (JP) ........................................ 2000-286790

(51) Int. Cl.⁷ ................................................. G11B 21/08
(52) U.S. Cl. .................................. 369/30.23; 369/47.33
(58) Field of Search ........................... 369/30.23, 30.24, 369/30.36, 30.27, 32.01, 33.01, 47.34, 47.32, 33; 711/3, 4, 105, 111

(56) References Cited

U.S. PATENT DOCUMENTS 5,237,575 A * 8/1993 Maeda et al. ............... 714/769
5,740,140 A * 4/1998 Arataki et al. ............ 369/53.45
5,831,955 A * 11/1998 Arataki et al. ............ 369/47.32
6,304,532 B2 * 10/2001 Kimura et al. ........... 369/47.34

FOREIGN PATENT DOCUMENTS

JP     10-334586     12/1998
JP     2000-195155     7/2000

* cited by examiner

Primary Examiner—Tan Dinh
(74) Attorney, Agent, or Firm—Oblon, Spivak, McClelland, Maier & Neustadt, P.C.

(57) ABSTRACT

An optical disk drive unit comprises, a target register for storing positional data on an optical disk for target data recorded in the optical disk, a comparator for comparing positional data on the optical disk for the read out data with the positional data stored in the target register, a delay circuit for delaying the data reproduced, and a buffer access circuit for carrying out control for starting transfer of data to a buffer RAM from output data of the delay circuit when it is detected that both positional data are coincident with each other by the comparator.

28 Claims, 10 Drawing Sheets

F I G. 2A  《CD-ROM》 Mode 0
F I G. 2B  Mode1
F I G. 2C  Mode2
F I G. 2D  Mode2 Form1
F I G. 2E  Mode2 Form2
F I G. 2F  《DVD》

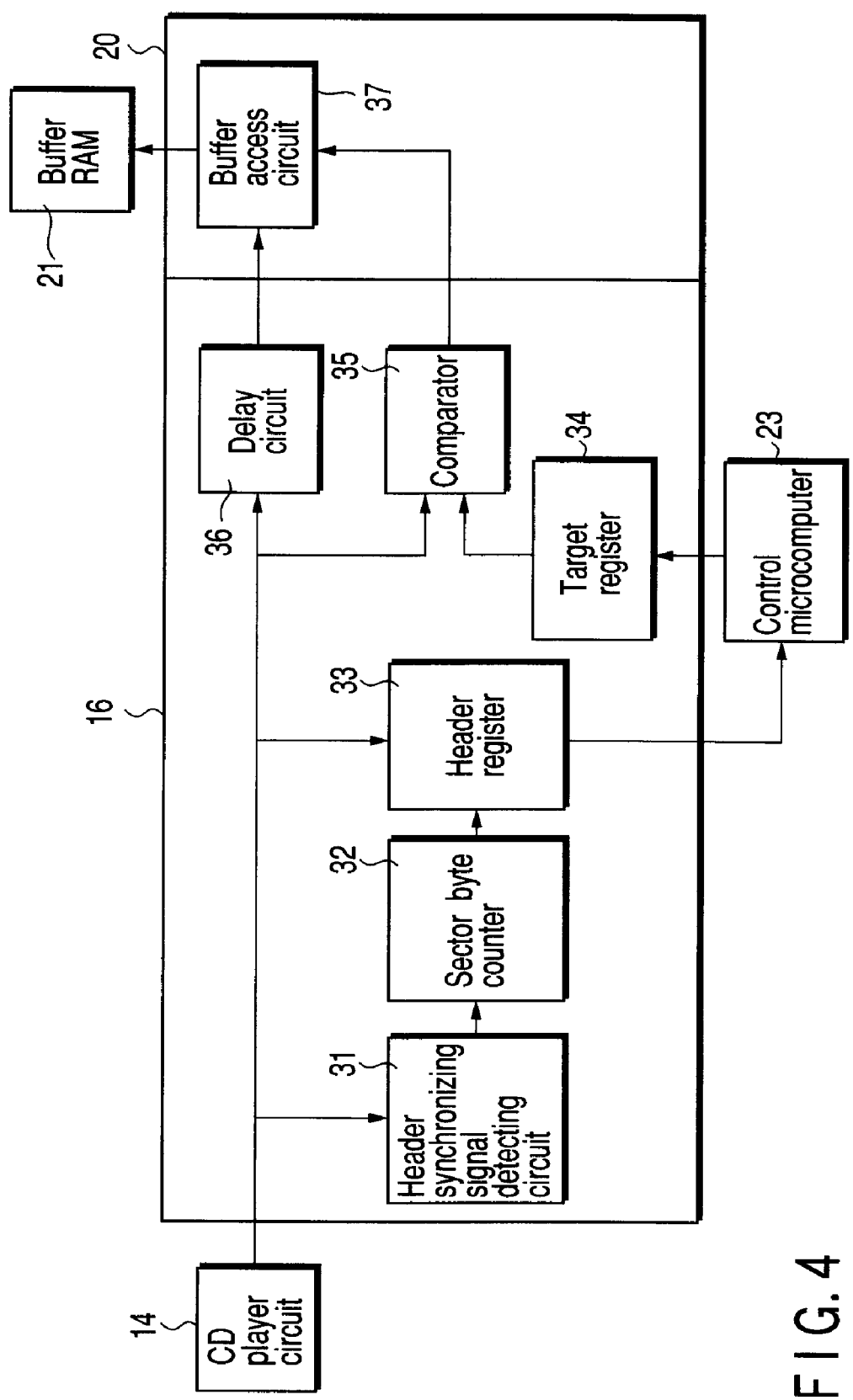
F I G. 4

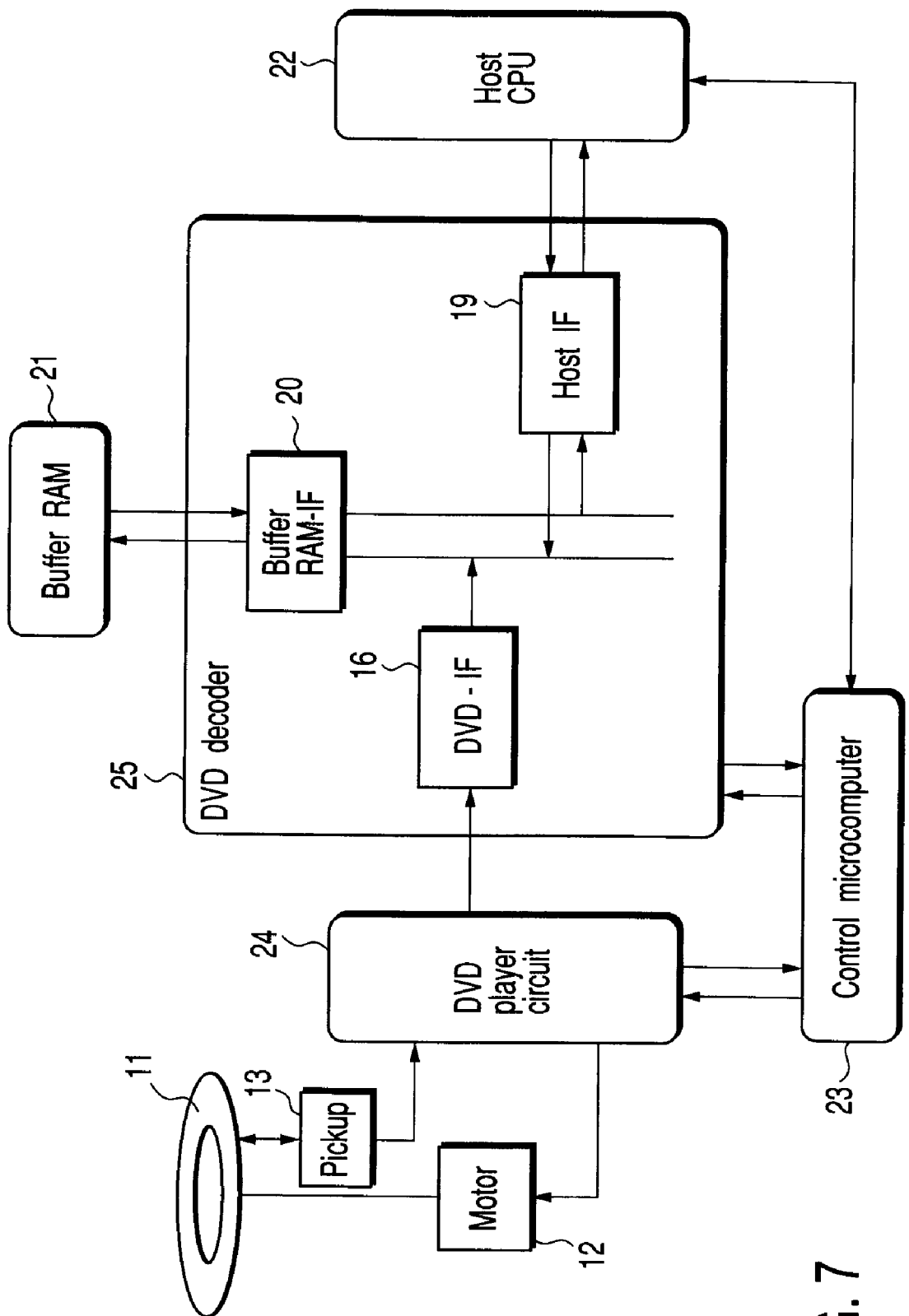
F I G. 7

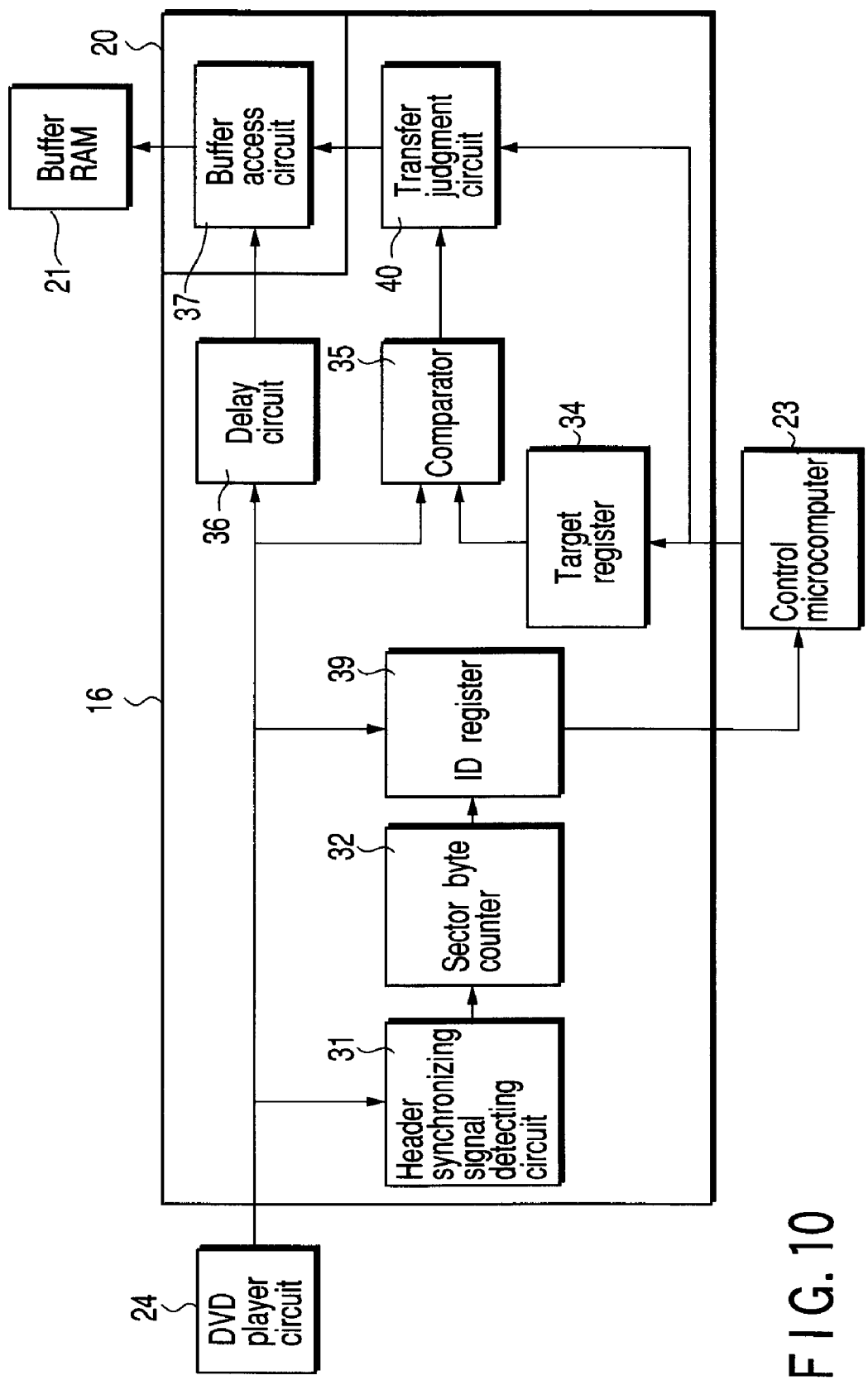
F I G. 10

OPTICAL DISK DRIVE UNIT

CROSS-REFERENCE TO RELATED APPLICATIONS

This application is based upon and claims the benefit of priority from the prior Japanese Patent Application No. 2000-286790, filed Sep. 21, 2000, the entire contents of which are incorporated herein by reference.

BACKGROUND OF THE INVENTION

1. Field of the Invention

The present invention relates to an optical disk drive unit by use of a medium such as CD (compact disk) or DVD (digital versatile disk). More particularly, the present invention relates to an optical disk drive unit that identifies target data read out from a medium, and that carries out control for transferring data to a buffer RAM; a decoder provided at the optical disk drive unit; and a buffer access circuit.

2. Description of the Related Art

Conventionally, for a CD-ROM or DVD-ROM drive unit, a DSP (digital signal processor) or the like is used as an input device provided in a CD player circuit or a DVD player circuit, the input device inputting data to a host CPU or the like. Then, in a process of acquiring data from this input device, and outputting the acquired data to an output device such as CPU after signal processing, it is required to temporarily store data in a buffer RAM in order to compensate for error correction or a difference in transfer speed between the input and output devices.

The data from the input device is stored in the buffer RAM in units of sectors. In this case, for the purpose of the convenience of signal processing such as error correction, data from a sector earlier than a sector required to be stored in the buffer RAM is outputted from the input device. The data stored in the buffer RAM is sequentially read out to be outputted to the output device. Therefore, the buffer RAM is used as a ring buffer. In this way, in order to use the buffer RAM as a ring buffer, it is required to recognize and manage a specific address instead of reading and writing data in batch.

In the meantime, in the input device, for example, in the CD-ROM drive unit, reproduced data from a CD player circuit is transferred to the buffer RAM in units of sectors to be stored in the buffer RAM. At this time, it is required to recognize and manage a specific sector address. In addition, at this time, data is recognized in units of sectors at a cycle of a synchronizing pattern.

When writing into the buffer RAM is started, positional information on a disk, header data, ID data, and sub-code Q data are extracted from CD-ROM, DVD and CD audio, respectively. It is required to detect a sector from these items of data, and know a reproduction position on an optical disk. A control microcomputer is used in order to recognize a position relevant to a target sector from the positional information on the optical disk.

In the meantime, data is sequentially inputted during access to the buffer RAM, thus making it necessary to set transfer start earlier than when the head of the target sector is inputted.

In this way, when data is transferred from the target sector data (target data) to the buffer RAM, and is written therein, header data earlier by one sector of the target sector or plurality of sectors is detected conventionally. When data obtained when the target sector is predicted to be inputted is detected earlier by one sector, data transfer to the buffer RAM is started from the next sector. When the data is detected earlier by a plurality of sectors, data transfer to the buffer RAM is started later by the plurality of sectors.

FIG. 1 is a timing chart showing an exemplary operation of a conventional optical disk drive unit configured to detect header data earlier than the target section by one sector, and transfer data to the buffer RAM.

A synchronizing detection signal is obtained by detecting header data of each sector. A control microcomputer reads out header data based on this synchronizing detection signal (header data reading). The control microcomputer judges whether or not the read out header data is a sector (n-1) earlier than a target sector (n) by one sector. When the judgment result is affirmative, the control microcomputer issues a transfer start command (i.e., issues a microcomputer transfer start command). A writing period signal is generated upon the receipt of this command, and writing from the data on the target sector (n) to be inputted into the buffer RAM is started based on this writing period signal.

In order to carry out the above described writing processing, the control microcomputer reads out header data, checks a sector position, and judges whether transfer start is enabled or disabled. Thus, a tremendously large amount of time is required for the above processing. In particular, in the recent CD-ROM drive unit or DVD drive unit is practically used such that a speed of reading out data from a disk is "n" times such as 2, 4, or 16 times as high as a standard speed. In this drive unit whose readout speed is "n" times as high as the standard speed, the period occupied by each sector is very short as compared with a case of the standard speed. Because of this, a control microcomputer requiring high speed processing and being expensive is used.

In addition, conventionally, transfer is started at a position at which a target sector is predicted to be reproduced, and there is no means for actually check the header data of the target sector before starting transferring. During disk reproduction, external shock is applied, or a track jump occurs due to a scratch on the disk or any other reason. Thus, there cannot be solved a problem that data cannot be correctly read out due to an incorrect data sector or disk eccentricity.

The above described problem occurs in the same way in the DVD-ROM drive unit as well.

As described above, conventionally, when data writing processing is carried out for the buffer RAM, a tremendously large amount of time is required for control microcomputer processing.

Further, conventionally, the header data on the target sector cannot be actually checked before starting transferring.

BRIEF SUMMARY OF THE INVENTION

According to one aspect of the present invention, there is provided a buffer access circuit in an optical disk drive unit, comprises:

a buffer RAM for temporarily storing data;

a target register for storing positional data on an optical disk for target data recorded in the optical disk;

a comparator connected to the target register, for comparing positional data on the optical disk for the data read out from the optical disk with the positional data stored in the target register;

a delay circuit for delaying data read out and reproduced from the optical disk for a predetermined period; and a buffer access control circuit connected to the comparator, the delay circuit and the buffer RAM, for carrying out control for starting transfer of data to the buffer RAM from the data that corresponds to the target data of the data outputted from the delay circuit, according to a control signal outputted from the comparator when the positional data stored in the target register coincides with the positional data on the optical disk for the data read out from the optical disk.

BRIEF DESCRIPTION OF THE SEVERAL VIEWS OF THE DRAWING

FIGS. 2A to 2F are views showing a variety of data formats of a CD-ROM and a DVD by one sector;

FIG. 4 is a block diagram showing a partially detailed configuration of a CD-ROM drive in FIG. 3;

FIG. 7 is a block diagram showing a configuration of a DVD-ROM drive unit according to a third embodiment of the present invention;

FIG. 10 is a block diagram showing a partially detailed circuit configuration of a DVD-ROM drive unit according to a fourth embodiment of the present invention.

DETAILED DESCRIPTION OF THE INVENTION

Hereinafter, preferred embodiments of the present invention will be described with reference to the accompanying drawings.

Prior to a description of the embodiments, the data formats of a CD-ROM and a DVD will be described.

FIG. 2A to FIG. 2F show a variety of data formats of a CD-ROM and a DVD by one sector. Among them, FIG. 2A to FIG. 2E each show a data format of the CD-ROM, and FIG. 2F shows a data format of the DVD. Each sector of the CD-ROM consists of 2352 bytes, and each sector of the DVD consists of 2064 bytes. The numerals enclosed within parentheses in FIG. 2A to FIG. 2E represent byte numbers of respective data.

The data format of the CD-ROM shown in FIG. 2A is referred to as Mode 0. In this format, each sector consists of: a 12-byte synchronizing pattern (header synchronizing signal: Sync); 4-byte header data (head); and main data (Data) on 2336-byte digital zero.

The data format of the CD-ROM shown in FIG. 2B is referred to as Mode 1. In this format, each sector consists of: a 12-byte synchronizing pattern (header synchronizing signal: Sync); 4-byte header data (Head); 2048-byte main data (Data); a 4-byte error detection code (error detection code; EDC); an 8-byte space (Space); and a 276-byte error correction code (error correction code).

The data format of the CD-ROM shown in FIG. 2C is referred to as Mode 2. In this format, each sector consists of a 12-byte synchronizing pattern (header synchronizing signal: Sync); 4-byte header data (Head); and 2336-byte main data (Data).

The data format of the CD-ROM shown in FIG. 2D is referred to as Mode 2 Form 1. In this format, each sector consists of a 12-byte synchronizing pattern (header synchronizing pattern: Sync); 4-byte header data (Head); 8-byte sub-header data (SubHead); 2048-byte main data (Data); a 4-byte error detection code (EDC); and a 276-byte error correction code (ECC).

The data format of the CD-ROM shown in FIG. 2E is referred to as Mode 2 Form 2. In this format, each sector consists of: a 12-byte synchronizing pattern (header synchronizing signal: Sync); 4-byte header data (Head); 8-byte sub-header data (SubHead); 2324-byte main data (Data); and a 4-byte error detection code (EDC).

In the data format of the DVD shown in FIG. 2F, each sector consists of: 4-byte ID data (ID); a 2-byte ID data error detection code (IED); a 6-byte space (Space); 2048-byte main data (Data); and a 4-byte error detection code (EDC).

Here, of the CD-ROM data formats, the 4-byte header data following the synchronizing pattern (Sync) contains positional data indicating which position on the CD the data of each sector is recorded. Similarly, the first 4-byte ID data (ID) in the DVD data format includes positional data indicating which position on the DVD the data of each sector is recorded.

(First Embodiment)

Figure 1:
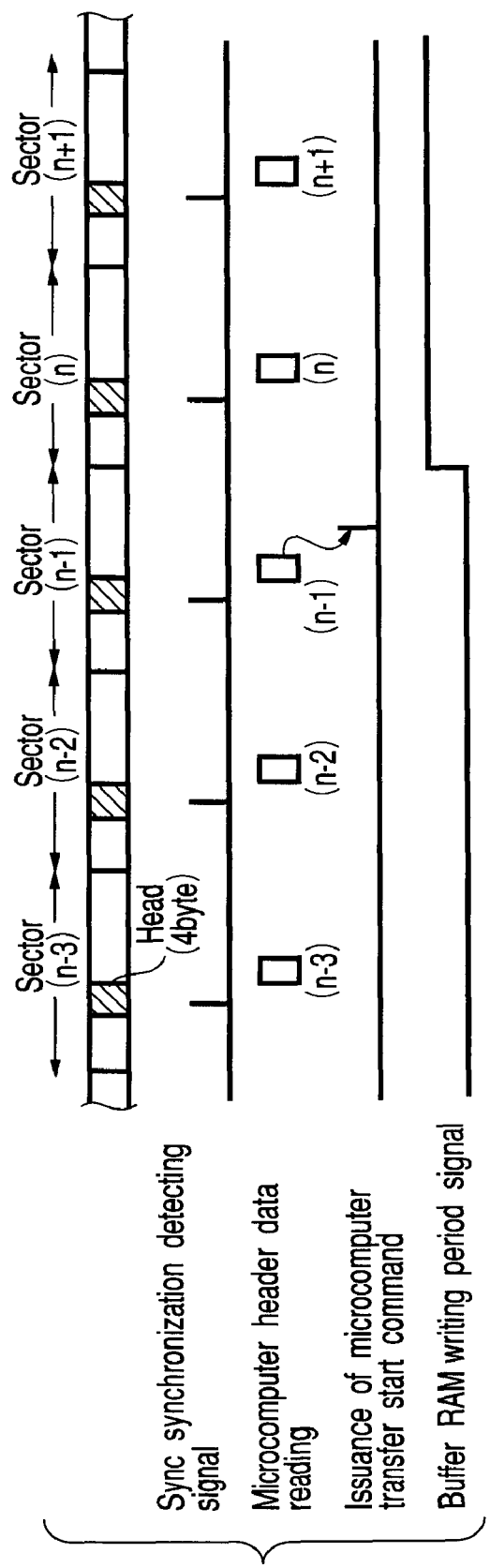
FIG. 1 is a timing chart showing an exemplary operation of a conventional CD-ROM drive unit.
Figure 3:
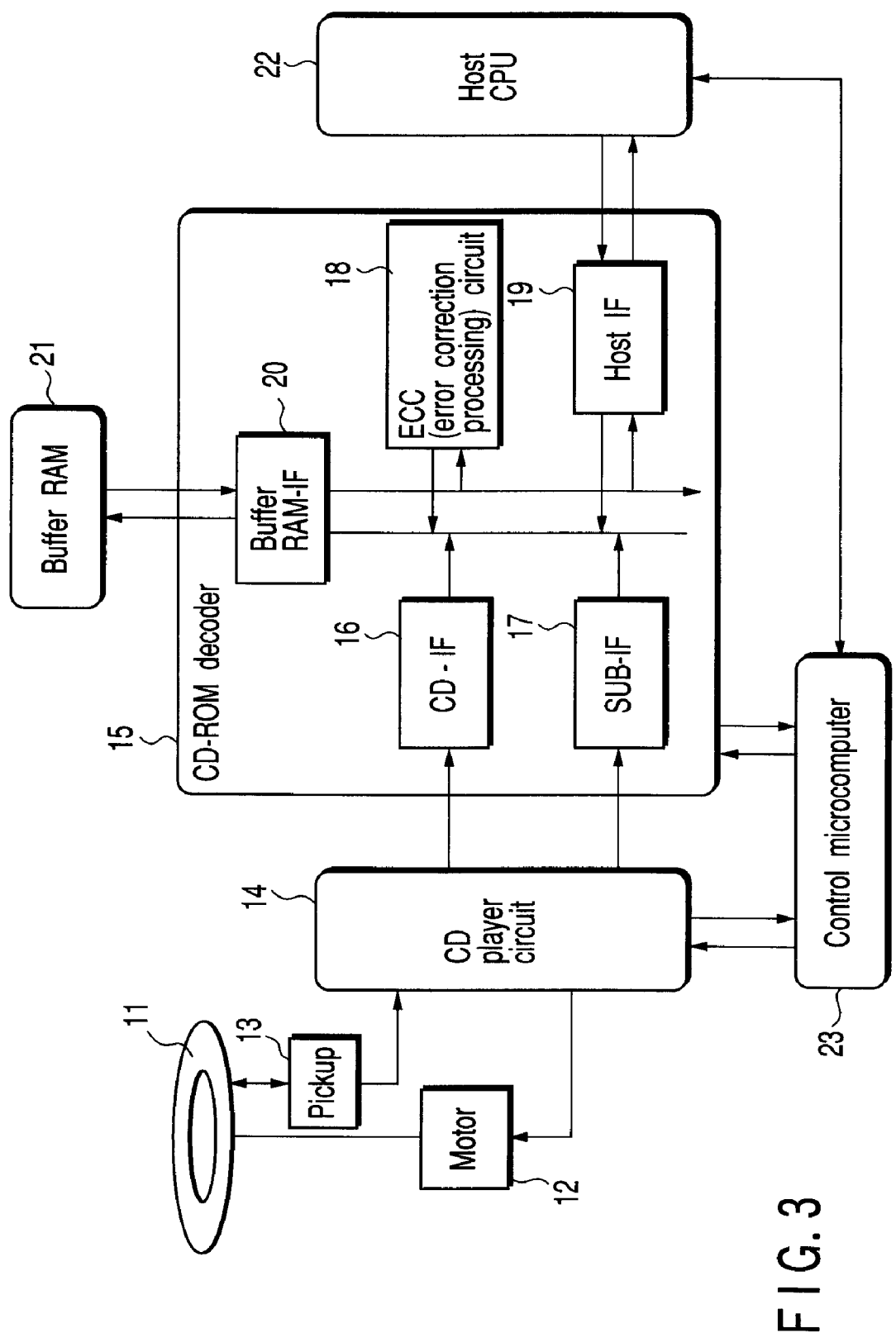
FIG. 3 is a block diagram showing a CD-ROM drive unit according to a first embodiment of the present invention.

FIG. 3 is a block diagram showing a configuration of a computer system that contains a CD-ROM drive unit according to a first embodiment of the present invention. An optical disk (CD) 11 as a medium digitally records data on a track, and is rotated by a spindle motor 12.

An optical pickup 13 as signal extracting means for reading data recorded in the optical disk 11 emits laser beams to a track on the optical disk 11. In this manner, a change in amount of light reflected and returned from a track on the optical disk 11 is detected, whereby data is read, and is outputted as an electric signal.

A CD player circuit 14 contains DSP or the like, reproduces data from an output signal of the optical pickup 13 and header data (sub-code data) including time information, carries out error detection, and controls the spindle motor 12. The data reproduced by the CD player circuit 14 is delivered to a CD-ROM decoder 15.

The CD-ROM decoder 15 is composed of a CD interface (CD-IF) 16, a sub-code interface (SUB-IF) 17, an ECC (error correction processing) circuit 18, a host interface (host IF) 19, a buffer RAM interface (buffer RAM-IF) 20 and the like. This decoder carries out data transfer control with a buffer RAM 21 for temporarily storing data to which error correction processing relevant to data reproduced by the CD player circuit 14 is applied, and carries out data transfer control with a host CPU 22.

A control microcomputer (microcomputer) 23 controls an operation of the CD player circuit 14 and the CD-ROM decoder 15 based on a command from the host CPU 22.

FIG. 4 shows a partially detailed configuration of the CD-ROM decoder 15 in the computer system shown in FIG. 3 together with the CD player circuit 14, the control microcomputer 23, and the buffer RAM 21.

A header synchronizing signal detecting circuit 31, a sector byte counter 32, a header register 33, a target register 34, a comparator 35, and a delay circuit 36 are provided at the CD-IF 16 in the CD-ROM decoder 15.

The header synchronizing signal detecting circuit 31 detects a header synchronizing signal that consists of a 12 byte positioned at the head of each sector, and outputs a sync synchronization detecting signal from reproduced data outputted from the CD player circuit 14.

A basic clock signal (not shown) synchronized with reproduced data is inputted to the sector byte counter 32. In this sector byte counter 32, when the sync synchronization detecting signal outputted from the header synchronizing signal detecting circuit 31 is inputted, the count content is cleared to "0". After clearing, this counter starts a count operation of the basic clock signal.

Reproduced data and a count output of the sector byte counter 32 are inputted to the header register 33. The header register 33 stores 4-type header data contained in the reproduced data in a period when the reproduced data and a value of the count output of the sector byte counter 32 counts a predetermined range, i.e., "4" from a state in which the content of the sector byte counter 32 is cleared to "0". The header data stored in the header register 33 is read out in the control microcomputer 23.

The control microcomputer 23 uses the header data read out from the header register 33, thereby judging which position the current reproduced data is set at. For example, when the control microcomputer 23 judges that the sector of the current reproduced data is earlier than a target sector that starts transfer to the buffer RAM 21 by some sectors, the microcomputer delivers data that corresponds to the target sector, and causes the sector to be set to the target register 34.

The comparator 35 compares the header data contained in the reproduced data on each sector with the data set to the target register 34, and outputs a buffer write enable signal when it is detected that both data are coincident with each other.

The delay circuit 36 outputs the reproduced data outputted from the CD player circuit 14 after delayed by a time corresponding to a period of the header data.

A buffer access circuit 37 configures part of a buffer RAM-IF 20 in FIG. 3, and has a function that carries out data writing control relevant to the buffer RAM 21. The delayed reproduced data outputted from the delay circuit 36 and a buffer write enable signal outputted from the comparator 35 are inputted to this buffer access circuit 37. Then, the buffer access circuit 37 carries out control for writing reproduced data on the buffer RAM 21 based on the buffer write enable signal.

Now, an operation of a circuit shown in FIG. 4 will be described with reference to a timing chart shown in FIG. 5.

When the header synchronizing signal detecting circuit 31 detects a header synchronizing signal (Sync) that consists of 12 bytes positioned at the head of each sector, the circuit 31 outputs a sync synchronization detecting signal from the reproduced data outputted from the CD player circuit 14. This header synchronizing signal generally has a data pattern such that the head and tail data are "00", respectively, and all the 10-byte data are "IFF" between the head and tail. When the header synchronizing signal detecting circuit 31 detects such a data pattern, the circuit 31 outputs a sync synchronization detecting signal.

When the sync synchronization detecting signal is outputted from the header synchronizing signal detecting circuit 31, the count content of the sector byte counter 32 is cleared. After clearing, the sector byte counter 32 starts counting a basic clock signal. Then, in a period when a value of a count output of the sector byte counter 32 is within a predetermined range, the header register 33 stores 4-byte header data on each sector contained in the reproduced data.

The control microcomputer 23 reads out the data stored in the header register 33 at an arbitrary timing (microcomputer header data reading). The control microcomputer 23 can judge a sector of the current reproduced data based on the read out header data. Then, when the control microcomputer 23 judges that the current reproduced data sector is a sector (n-3) that is earlier than a target sector (n) by three sectors, the target sector data is set to the target register 34 (microcomputer target data set).

Then, the data according to the current reproduced data sector is compared with the data on the target sector set to the target register by the comparator 35. When both data are coincident with each other, the comparator 35 outputs a buffer write enable signal.

When this buffer write enable signal is inputted, the buffer access circuit 37 starts a data write operation relevant to the buffer RAM 21. When reproduced data is inputted to the buffer access circuit 37 intact without any delay, at a time when the buffer write enable signal is inputted, a period of the header data (Head) of the target sector has already elapsed, and may enter a period of the main data (Data). Because of this, the target sector data cannot be written into the buffer RAM 21 from the head.

Figure 5:
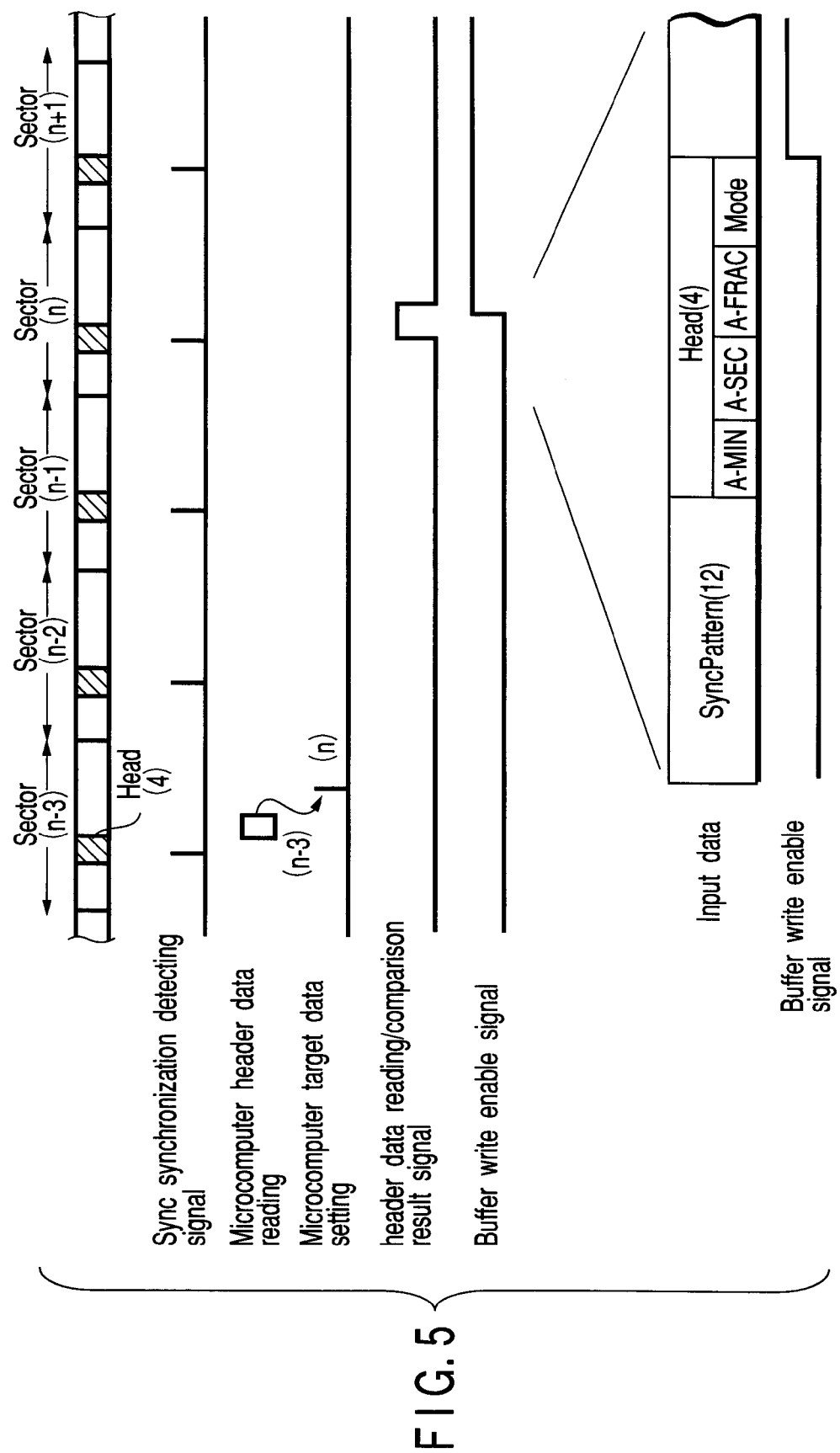
FIG. 5 is a timing chart showing an exemplary operation of a circuit in FIG. 4.

In the present embodiment, a delay circuit 36 is provided, and reproduced data is delayed by a period of 4-byte header data (Head), as shown in FIG. 5, so as to input the delayed data to the buffer access circuit 37. As a result, a timing at which a buffer write enable signal inputted to the buffer access circuit 37 is activated (rises to a level H) is coincident with a timing at which target sector data (Data) reaches the buffer access circuit 37, so that the target sector main data (Data) can be written into the buffer RAM 21 from the head.

In addition, when data is written from a synchronizing pattern (Sync) to the buffer RAM 21, a 16-byte delay may be carried out in the delay circuit 36.

In the case of CD-ROM, as shown in FIG. 5, the 4-byte header data (Head) consists of: A-MIN indicating that the first 1 byte is at a position of minutes of the such sector, A-SEC indicating that a next 1 byte is at a position of seconds of the sector, A-FRAM indicating that a next 1 byte is at a position of frames of the sector, and Mode indicating that a last 1 byte is data mode.

As has been described above, according to the above described embodiment, the control microcomputer 23 merely sets a target sector to a target register 34 at a predetermined timing, whereby the CD-ROM decoder 15 (overall configuration shown in FIG. 3) detects a target sector after the setting. After the target sector has been detector, the target sector main data (Data) is written from the head to the buffer RAM 21, and thus, processing of the control microcomputer 23 is reduced.

As a result, even when the present invention is carried out for a CD-ROM drive unit having a current n-time speed reproduction function, an expensive control microcomputer 23 capable of high speed operation is not required.

In addition, data is written into the buffer RAM 21 by the comparator 35 based on the result of comparison between the current reproduced data sector and the target sector, and the target sector header data is actually checked.

As a result, when an external shock is applied, and a track jump occurs due to any reason such as scratch on the disk) during disk reproduction or when data is not correctly read out due to disk eccentricity, a buffer write enable signal is not outputted from the comparator 35. In this manner, even when data cannot be correctly read out due to an incorrect data sector or disk eccentricity, there is no danger that incorrect data is not written.

The above comparator 35 can be realized by an exclusive OR circuit having an input by a data length of data that corresponds to a position on the disk (in this case, by three bytes consisting of A-MIN, A-SEC, and frame, namely, 24 bites) of the data that corresponds to the target sector stored in the target register 34 and the header data contained in the reproduced data. The delay circuit 36 can be realized by a delay line using a latch circuit, a flip flop circuit and the like, and the other header synchronizing signal detecting circuit 31, sector byte counter 32, and header register 33 can be realized by a circuit having its comparatively simple configuration.

(Second Embodiment)

Figure 6:
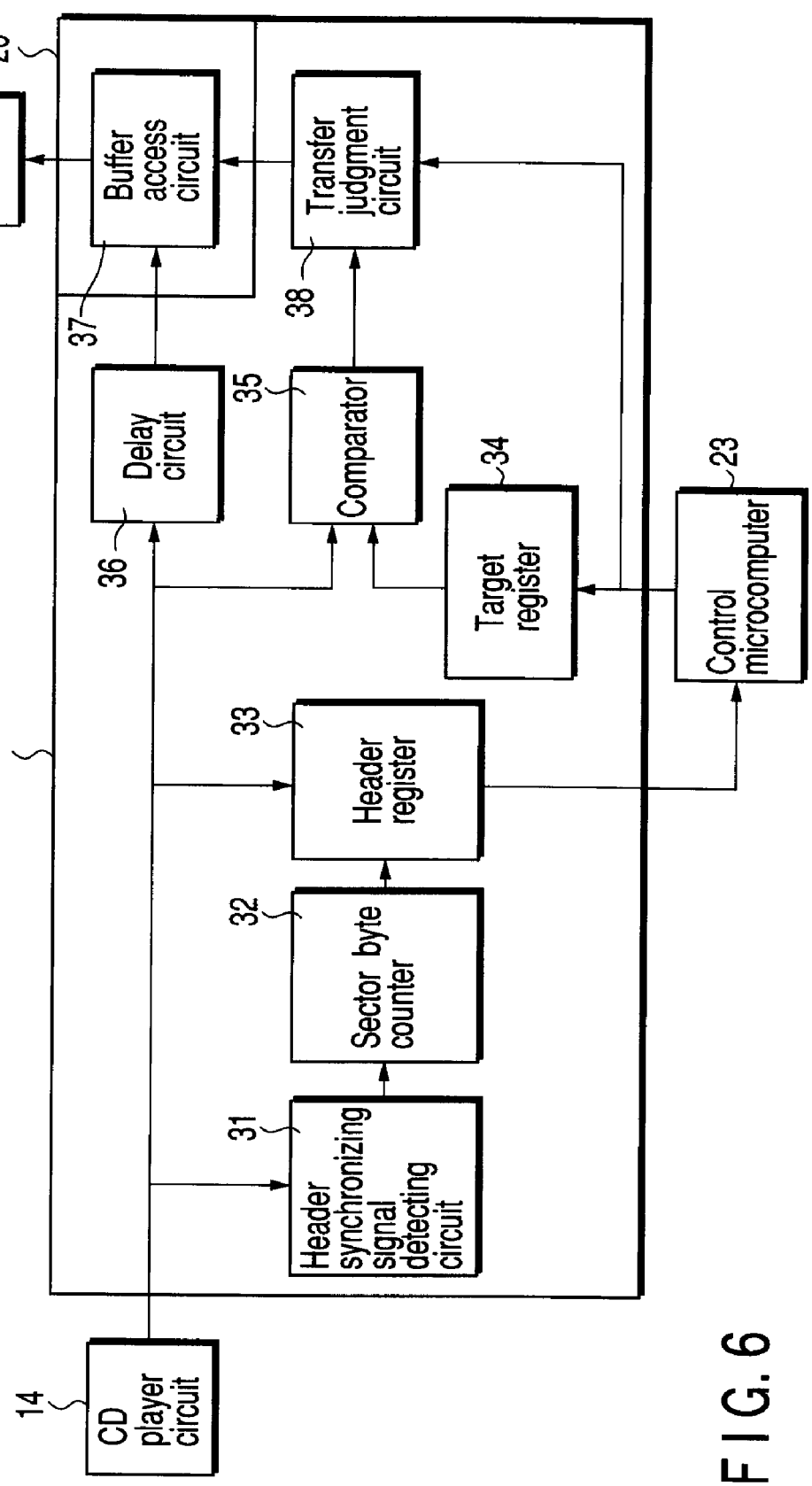
FIG. 6 is a block diagram showing a partially detailed configuration of a CD-ROM drive unit according to a second embodiment of the present invention.

FIG. 6 is a block diagram showing a CD-ROM drive unit according to a second embodiment of the present invention. A partially detailed configuration of the CD-ROM decoder 15 in a computer system shown in FIG. 3 is shown together with a CD player 14, a control microcomputer 23, and a buffer RAM 21.

The CD-ROM drive unit in the present embodiment is different from that shown in FIG. 4 in that a transfer judgment circuit 38 is newly added in a CD-IF 16; a buffer write enable signal outputted from a comparator 35 is inputted to this transfer judgment circuit 38, and further, an operation of a buffer access circuit 37 is controlled based on an output of this transfer judgment circuit 38.

The transfer judgment circuit 38 outputs a buffer write enable signal to the buffer access circuit 37 based on a flag outputted from the control microcomputer 23 during a period when reproduced data is correct, and stability is ensured.

That is, only in a period when reproduced data is correct, and stability is ensured, a buffer write enable signal is inputted to the buffer access circuit 37, and thus, correct data is always written into the buffer RAM 21.

Here, the above flag is set based on any one of the following items (1) to (4), for example.

(1) EDC computation result obtained when error correction is carried out in units of sectors This flag is set based on the contents of an error detection code in a format shown in FIG. 2B, for example. This flag is set in the case where data contained in a sector includes an error.

(2) IPF (interpolation flag) when the CD player 14 adds to main data in units of bytes (3) A state indicating whether or not header data is continuous to a plurality of sectors (4) A state indicating whether or not IPF is added to header data According to the present embodiment, there can be provided advantageous effect similar to that according to the first embodiment, and there can be provided advantageous effect that correct main data can always be written into the buffer RAM 21.

(Third Embodiment)

FIG. 7 is a block diagram showing a configuration of a computer system that contains a DVD-ROM drive unit according to a third embodiment of the present invention. The system shown in FIG. 7 is different from that shown in FIG. 3 in that a DVD is used as an optical disk 11 instead of CD; a DVD player circuit 24 is used instead of a CD player circuit 14; and a DVD decoder 25 is used instead of a CD-ROM decoder 15. The DVD decoder 25 is composed of a DVD interface (DVD-IF) 26, a host interface (host IF) 19, and a buffer RAM interface (buffer RAM-IF) 20.

Figure 8:
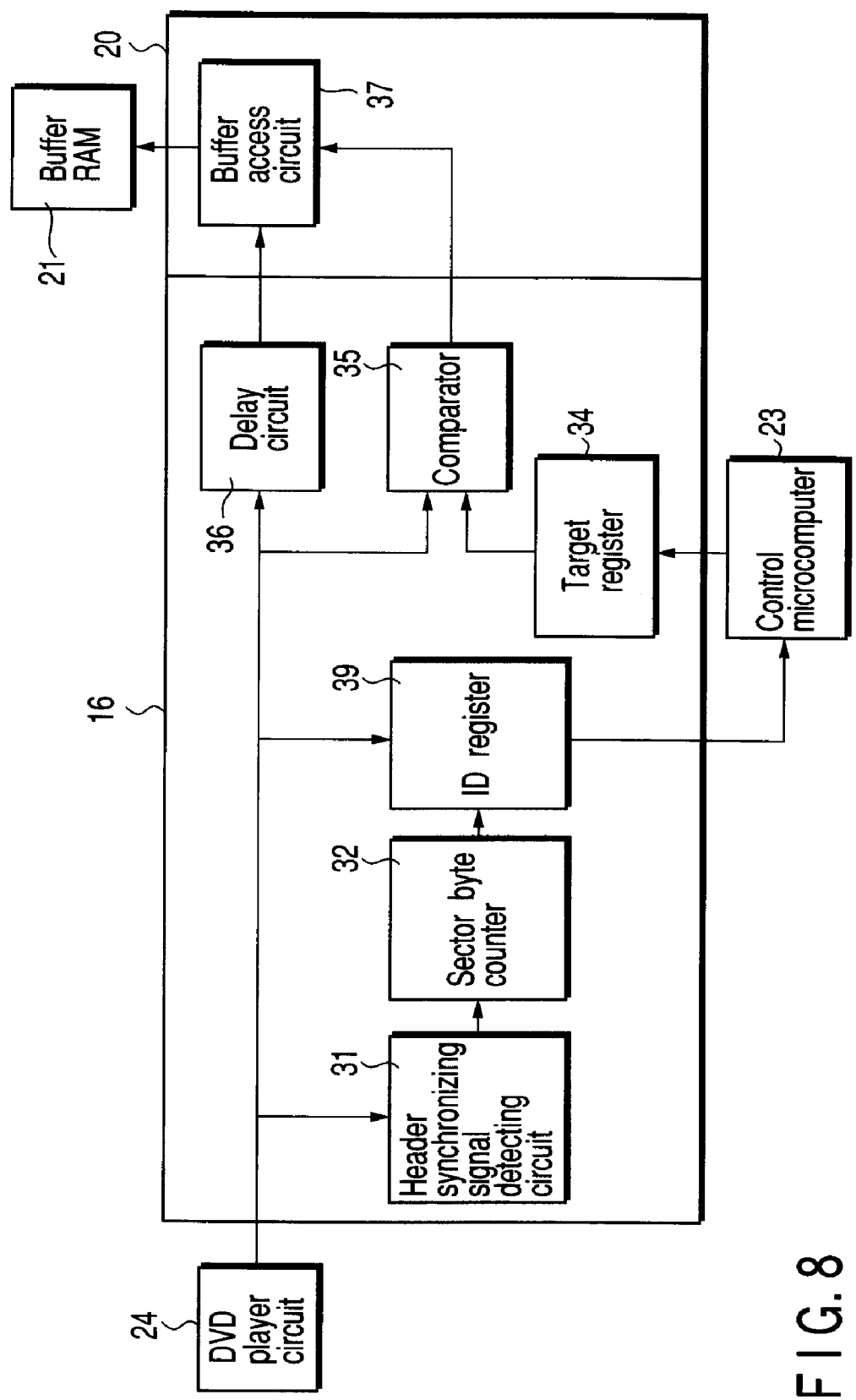
FIG. 8 is a block diagram showing a partially detailed configuration of a DVD-ROM drive unit in FIG. 7.
Figure 9:
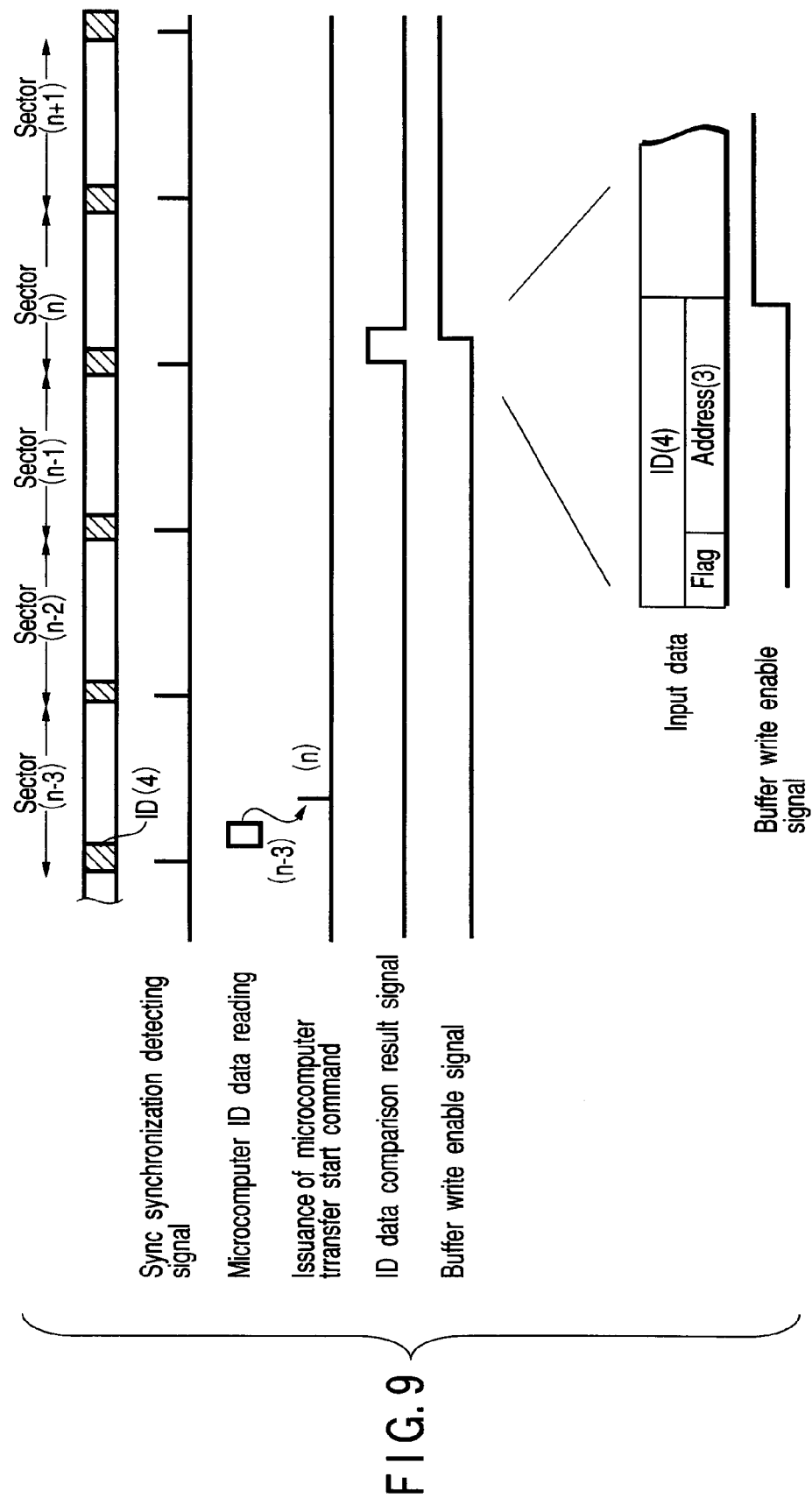
FIG. 9 is a timing chart showing an exemplary operation of a circuit in FIG. 8.

FIG. 8 is a partially detailed configuration of the DVD decoder 25 in the computer system shown in FIG. 7 together with a DVD player circuit 24, a control microcomputer 23, and a buffer RAM 21. FIG. 9 is a timing chart showing an exemplary operation of the circuit shown in FIG. 8.

In the present embodiment, a header synchronizing signal detecting circuit 31, a sector byte counter 32, an ID register 39, a target register 34, a comparator 35, and a delay circuit 36 are provided at a DVD-IF 26 in the DVD decoder 25. Here, the above header synchronizing signal detecting circuit 31, sector byte counter 32, ID register 39, target register 34, comparator 35, and delay circuit 36 correspond to the header synchronizing signal detecting circuit 31, sector byte counter 32, header register 33, target register 34, comparator 35, and delay counter 36 in the CD-IF 16 of the CD-ROM drive unit shown in FIG. 4, respectively. The respective basic functions are similar to those shown in FIG. 4. Descriptions of individual functions and entire operation are omitted here. Here, only difference from FIG. 4 will be described.

In the present embodiment, although a header synchronizing signal is not shown in a DVD format shown in FIG. 2F, the signal is reproduced by the DVD player circuit 24, and the reproduced signal is inputted to the header synchronizing signal detecting circuit 31.

In addition, 4-byte ID data shown in FIG. 2F is used as address data according to a position on a disk of sector data. The ID data consists of a flag (Flag) at the first 1 byte, and an address (Address) at the last 3 bytes as shown in FIG. 9.

An ID register 39 stores 4-byte ID data contained in reproduced data in a period when a value for a count output of a sector byte counter 32 is within a predetermined range, namely, from a state where the content of the byte counter 32 is cleared to "0" to a state where "4" is counted.

The comparator 35 compares an address (Address) that consists of 3 bytes from among the ID data contained in the reproduced data on each sector with the data set in the target register 34, and outputs a buffer enable signal when both data are coincident with each other.

The delay circuit 36 outputs the reproduced data outputted from the DVD player circuit 24 after delayed by an ID data period, namely, a time that corresponds to 4 bytes.

In the present embodiment as well, the delay circuit 36 is provided, and reproduced data is delayed by 4-byte ID data period, as shown in FIG. 9 so as to be inputted to the buffer access circuit 37. As a result, a timing when a buffer write enable signal inputted to the buffer access circuit 37 is activated is coincident with a timing when target sector main data (Data) reaches the buffer access circuit 37, so that the target sector main data (Data) can be written into the buffer RAM 21 from the head.

Therefore, as in the case of the first and second embodiments, the control microcomputer 23 merely sets a target sector to the target register 34 at a predetermined timing, whereby the DVD decoder 25 detects the target sector after setting. When the target sector has been detected, the target sector main data (Data) is written into the buffer RAM 21 from the head, and thus, processing of the control microcomputer 23 is reduced.

In addition, data is written into the buffer RAM 21 by the comparator 35 based on the result of comparison between the current reproduced data sector and the target sector, and the target sector header data is actually checked. Thus, even when data cannot be correctly read due to an incorrect data sector or disk eccentricity, there is no danger that incorrect data is written.

(Fourth Embodiment)

FIG. 10 is a block diagram showing a DVD drive unit according to a fourth embodiment of the present invention. This shows a partially detailed configuration of a DVD decoder 25 in the computer system shown in FIG. 7 together with a DVD player 24, a control microcomputer 23, and a buffer RAM 21.

In the present embodiment, a transfer judgment circuit 40, that corresponds to a transfer judgment circuit 38 added to the CD-ROM drive unit according to the embodiment shown in FIG. 6, is added to the DVD drive unit according to the third embodiment shown in FIG. 8. Therefore, like elements corresponding to those in FIG. 8 are designated by like reference numerals. A duplicate description is omitted here.

The above transfer judgment circuit 40 outputs a buffer write enable signal to a buffer access circuit 37 based on a flag outputted from the control microcomputer 23 in a period when stability is ensured. That is, only a period when reproduced data is correct, and stability is ensured, a buffer write enable signal is inputted to the buffer access circuit 37, and thus, correct data is always written into the buffer RAM 21.

In this case, the above flag is set based on any one of the following items (1) to (5).

(1) EDC computation result obtained when error detection is carried out in units of sectors (2) IPF (Interpolation flag) when the DVD player circuit is added to main data in units of bytes (3) A state indicating whether or not ID data is continuous relevant to a plurality of sectors (4) A state indicating whether or not IPF is added to ID data This flag is set based on the content of an ID data error detection code in a format shown in FIG. 2F, for example. This flag is set in the case where ID data contains an error.

(5) ID data error correction or error detection result

According to the present embodiment, there can be provided advantageous effect similar to those according to the third embodiment, and there can be provided advantageous effect that correct main data can be always written into the buffer RAM 21.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A buffer access circuit in an optical disk drive unit, comprising:

a buffer RAM for temporarily storing data;

a target register for storing positional data on an optical disk for target data recorded in the optical disk;

a comparator connected to the target register, for comparing positional data on the optical disk for the data read out from the optical disk with the positional data stored in the target register;

a delay circuit for delaying data read out and reproduced from the optical disk for a predetermined period; and a buffer access control circuit connected to the comparator, the delay circuit and the buffer RAM, for carrying out control for starting transfer of data to the buffer RAM from the data that corresponds to the target data of the data outputted from the delay circuit, according to a control signal outputted from the comparator when the positional data stored in the target register coincides with the positional data on the optical disk for the data read out from the optical disk.

2. The circuit according to claim 1, wherein said delay circuit delays data by a data length according to positional data on data read out and reproduced from the optical disk.

3. A buffer access circuit in an optical disk drive unit, comprising:

a buffer RAM for temporarily storing data;

a target register for storing positional data on the optical disk for target data recorded in the optical disk;

a comparator connected to the target register, for comparing positional data on the optical disk for data read out from the optical disk with the positional data stored in the target register;

a delay circuit for delaying data read out from the optical disk a predetermined period;

a judgment circuit connected to the delay circuit, for judging whether or not stability of the data read out from the optical disk is ensured; and a buffer access control circuit connected to the delay circuit and the judgment circuit, for, when it is judged by the judgment circuit that the stability of data read out from the optical disk is ensured, carrying out control for starting transfer of data to the buffer RAM from the data that corresponds to the target data of the data outputted from the delay circuit according to a control signal outputted from the comparator when the positional data stored in the target data is coincident with the positional data on the optical disk for the data read out from the optical disk.

4. The circuit according to claim 3, wherein said delay circuit delays data by a data length according to positional data on data read out and reproduced from the optical disk.

5. A buffer access circuit in an optical disk drive unit, comprising:

a target register for storing positional data on the optical disk for target data recorded in the optical disk;

a comparator connected to the target register, for comparing positional data on the optical disk for data read out from the optical disk with the positional data stored in the target register;

a delay circuit for delaying data read out and reproduced from the optical disk for a predetermined period; and a buffer access control circuit connected to the comparator, the delay circuit and the buffer RAM, for carrying out control for starting transfer of data to the buffer RAM from the data that corresponds to the target data of the data outputted from the delay circuit, according to a control signal outputted from the comparator when the positional data stored in the target register coincides with the positional data on the optical disk for the data read out from the optical disk.

6. The circuit according to claim 5, wherein said delay circuit delays data by a data length according to positional data on data read out and reproduced from the optical disk.

7. A buffer access circuit in an optical disk drive unit, comprising:

a target register for storing positional data on the optical disk for target data recorded in the optical disk;

a comparator connected to the target register, for comparing positional data on the optical disk for data read out and reproduced from the optical disk with the positional data stored in the target register;

a delay circuit for delaying data read out from the optical disk a predetermined period;

a judgment circuit connected to the comparator, for judging whether or not stability of the data read out from the optical disk is ensured; and a buffer access control circuit connected to the comparator, the delay circuit, and the judgment circuit, for, when it is judged by the judgment circuit that the stability of data read out from the optical disk is ensured, carrying out control for starting transfer of data to the buffer RAM from the data that corresponds to the target data of the data outputted from the delay circuit according to a control signal outputted from the comparator when the positional data stored in the target data is coincident with the positional data on the optical disk for the data read out from the optical disk.

8. The circuit according to claim 7, wherein said delay circuit delays data by a data length according to positional data on data read out and reproduced from the optical disk.

9. A decoder circuit for an optical disk drive unit comprising:

a buffer RAM for temporarily storing reproduced data read out from the optical disk and converted into digital data;

a target register for storing positional data on the optical disk for target data recorded in the optical disk;

a comparator connected to the target register, for comparing positional data on the optical disk for data read out from the optical disk with the positional data stored in the target resistor;

a delay circuit for delaying the reproduced data for a predetermined period; and a buffer access control circuit connected to the comparator, the delay circuit and the buffer RAM, for carrying out control for starting transfer of data to the buffer RAM from the data that corresponds to the target data of the data outputted from the delay circuit, according to a control signal outputted from the comparator when the positional data stored in the target register is coincident with the positional data on the optical disk for the data read out from the optical disk;

an error correction processing circuit connected to the buffer RAM, for carrying out error correction for the data stored in the buffer RAM; and a host interface connected to the buffer RAM, for transferring the data stored in the buffer RAM to a host CPU.

10. The circuit according to claim 9, wherein said delay circuit delays data by a data length according to positional data on the reproduced data.

11. The circuit according to claim 9, wherein said optical disk is a CD-ROM.

12. The circuit according to claim 9, wherein said optical disk is a DVD.

13. A decoder circuit for an optical disk drive unit comprising:

a buffer RAM for temporarily storing reproduced data read out from the optical disk and converted into digital data;

a target register for storing positional data on the optical disk for target data recorded in the optical disk;

a comparator connected to the target register, for comparing positional data on the optical disk for data read out from the optical disk with the positional data stored in the target disk;

a delay circuit for delaying the reproduced data for a predetermined period;

a judgment circuit connected to the comparator, for judging whether or not the stability of the data read out from the optical disk is ensured; and a buffer access control circuit connected to the comparator, the delay circuit, and the buffer RAM, for, when it is judged by the judgment circuit that the stability of data read out from the optical disk is ensured, carrying out control for starting transfer of data to the buffer RAM from the data that corresponds to the target data of the data outputted from the delay circuit according to a control signal outputted from the comparator when the positional data stored in the target register is coincident with the positional data on the optical disk for the data read out from the optical disk.

14. The circuit according to claim 13, wherein said delay circuit delays data by a data length according to positional data of the reproduced data.

15. The circuit according to claim 13, wherein said optical disk is a CD-ROM.

16. The circuit according to claim 13, wherein said optical disk is a DVD.

17. An optical disk drive unit comprising:

a pickup for reading data recorded in an optical disk as an electric signal;

a signal processing circuit connected to the pickup, for processing the electric signal read by the pickup, thereby reproducing data.

a buffer RAM for temporarily storing data reproduced by the signal processing circuit;

a target register for storing positional data on the optical disk for target data recorded in the optical disk;

a comparator connected to the target register, for comparing positional data on the optical disk for the data read out from the optical disk with the positional data stored in the target register;

a delay circuit connected to the signal processing circuit, for delaying the data reproduced by the signal processing circuit for a predetermined period;

a buffer access control circuit connected to the comparator, the delay circuit, and the buffer RAM, for carrying out control for starting transfer of data to the buffer RAM from the data that corresponds to the target data from the data outputted from the delay circuit, according to a control signal outputted from the comparator when the positional data stored in the target register is coincident with the positional data on the optical disk for the data read out from the optical disk;

an error correction processing circuit connected to the buffer RAM, for carrying out error correction for the data stored in the buffer RAM; and a host interface connected to the buffer RAM, for transferring the data stored in the buffer RAM to a host CPU.

18. The unit according to claim 17, wherein said delay circuit delays data by a data length according to the position data of the reproduced data.

19. The unit according to claim 17, wherein said optical disk is a CD-ROM.

20. The unit according to claim 19, wherein said judgment circuit judges whether or not data stability is ensured based on any one of an error detection flag added to the data read out from said optical disk according to a result obtained when error detection has been carried out in units of sectors; an interpolation flag added to data in units of bytes relevant to the data read out from said optical disk; a state indicating whether or not header data is continuous to a plurality of sectors of the data read out from said optical disk; and a state indicating whether or not the interpolation flag is added to header data.

21. The unit according to claim 17, wherein said optical disk is a DVD.

22. The unit according to claim 17, wherein said judgment circuit judges whether or not data stability is ensured based on any one of an error detection flag added to the data read out from said optical disk according to a result obtained when error detection has been carried out in units of sectors; an interpolation flag added to data in units of bytes relevant to the data read out from said optical disk; a state indicating whether or not ID data is continuous to a plurality of sectors for the data read out from said optical disk; a state indicating whether or not the interpolation flag is added to ID data; and ID data error correction or error detection result.

23. An optical disk drive unit comprising:

a pickup for reading data recorded in an optical disk as an electric signal;

a signal processing circuit connected to the pickup, for processing the electric signal read by the pickup, thereby reproducing data.

a buffer RAM for temporarily storing the data reproduced by the signal processing circuit;

a target register for storing positional data on the optical disk for target data recorded in the optical disk;

a comparator connected to the target register, for comparing positional data on the optical disk for data read out from the optical disk with the positional data stored in the target register;

a delay circuit connected to the signal processing circuit, for delaying the data reproduced by the signal processing circuit for a predetermined period;

a judgment circuit connected to the comparator, for judging whether or not the stability of data read out from the optical disk is ensured;

a buffer access control circuit connected to the comparator, the delay circuit, and the buffer RAM, for, when it is judged by the judgment circuit that the stability of data read out from the optical disk is ensured, carrying out control for starting transfer of data to the buffer RAM from the data that corresponds to the target data of the data outputted from the delay circuit according to a control signal outputted from the comparator when the positional data stored in the target register is coincident with the positional data on the optical disk for the data read out from the optical disk;

an error correction processing circuit connected to the buffer RAM, for carrying out error correction for the data stored in the buffer RAM; and a host interface connected to the buffer RAM, for transferring the data stored in the buffer RAM to a host CPU.

24. The unit according to claim 23, wherein said delay circuit delays data by a data length according to the position data of the reproduced data.

25. The unit according to claim 23, wherein said optical disk is a CD-ROM.

26. The unit according to claim 25, wherein said judgment circuit judges whether or not data stability is ensured based on any one of an error detection flag added to the data read out from said optical disk according to a result obtained when error detection has been carried out in units of sectors; an interpolation flag added to data in units of bytes relevant to the data read out from said optical disk; a state indicating whether or not header data is continuous to a plurality of sectors of the data read out from said optical disk; and a state indicating whether or not the interpolation flag is added to header data.

27. The unit according to claim 23, wherein said optical disk is a DVD.

28. The unit according to claim 27, wherein said judgment circuit judges whether or not data stability is ensured based on any one of an error detection flag added to the data read out from said optical disk according to a result obtained when error detection has been carried out in units of sectors; an interpolation flag added to data in units of bytes relevant to the data read out from said optical disk; a state indicating whether or not ID data is continuous to a plurality of sectors for the data read out from said optical disk; a state indicating whether or not the interpolation flag is added to ID data; and ID data error correction or error detection result.

* * * * *